United States Patent [19]

French

[11] Patent Number: 4,462,182
[45] Date of Patent: Jul. 31, 1984

[54] ANIMAL TRAP

[76] Inventor: Roy E. French, 12644 Peacock Rd., Laingsburg, Mich. 48848

[21] Appl. No.: 383,714

[22] Filed: Jun. 1, 1982

[51] Int. Cl.³ .............................................. A01M 23/34
[52] U.S. Cl. ......................................... 43/85; 43/131
[58] Field of Search .................... 43/85, 86, 87, 124, 43/131

[56] References Cited

U.S. PATENT DOCUMENTS

| 136,842 | 3/1873 | Lovett . | |
|---|---|---|---|
| 712,182 | 10/1902 | Cox . | |
| 777,461 | 12/1904 | Williamson . | |
| 882,755 | 3/1908 | Hamilton . | |
| 1,363,260 | 12/1920 | Morrison . | |
| 1,807,171 | 5/1931 | Pisani . | |
| 2,286,912 | 6/1942 | Johnson . | |
| 2,590,489 | 3/1952 | Bailey | 43/86 |

Primary Examiner—Nicholas P. Godici
Assistant Examiner—Thomas S. Mieczkowski
Attorney, Agent, or Firm—Miller, Morriss & Pappas

[57] ABSTRACT

A dome covered bait carrying animal trap employing a scent attraction through passageways in the base in which an anti-friction support for the trip-trigger results in an improved performance snare trap kill requiring no contact by the user of the traps with the animal caught and eliminated.

2 Claims, 4 Drawing Figures

U.S. Patent    Jul. 31, 1984    4,462,182
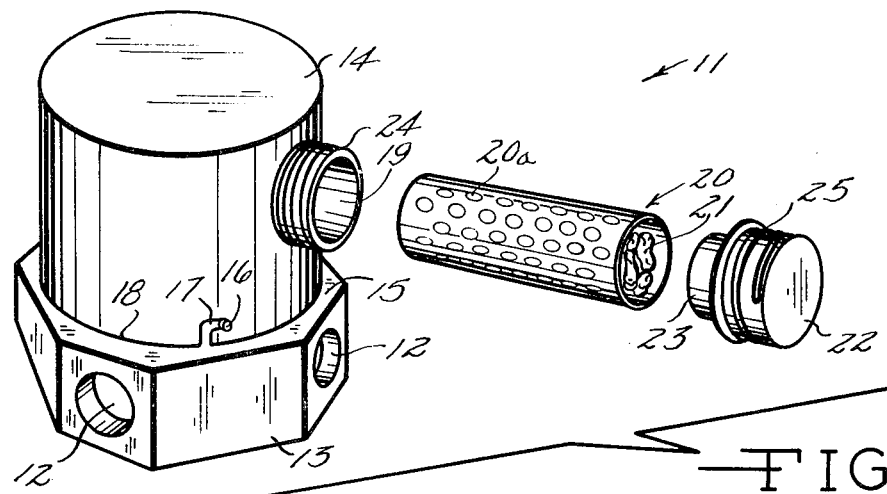
FIG. 1
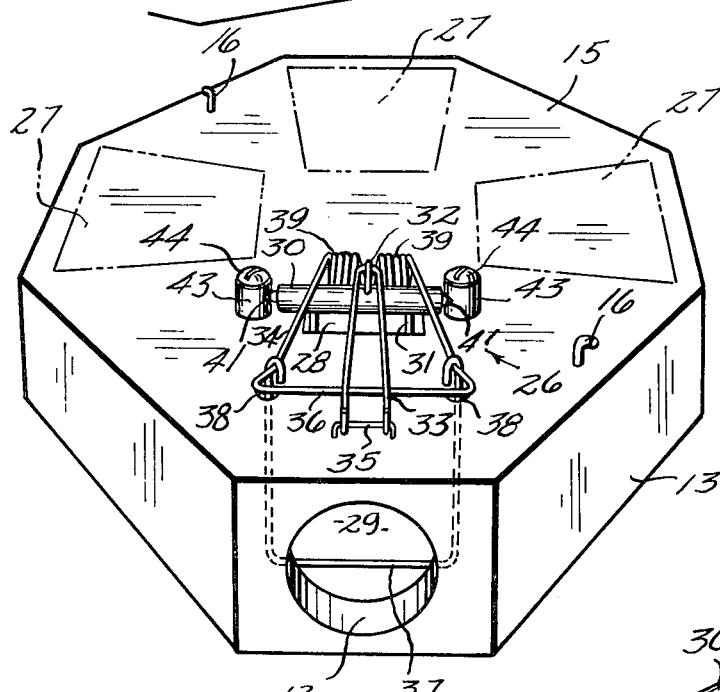
FIG. 2
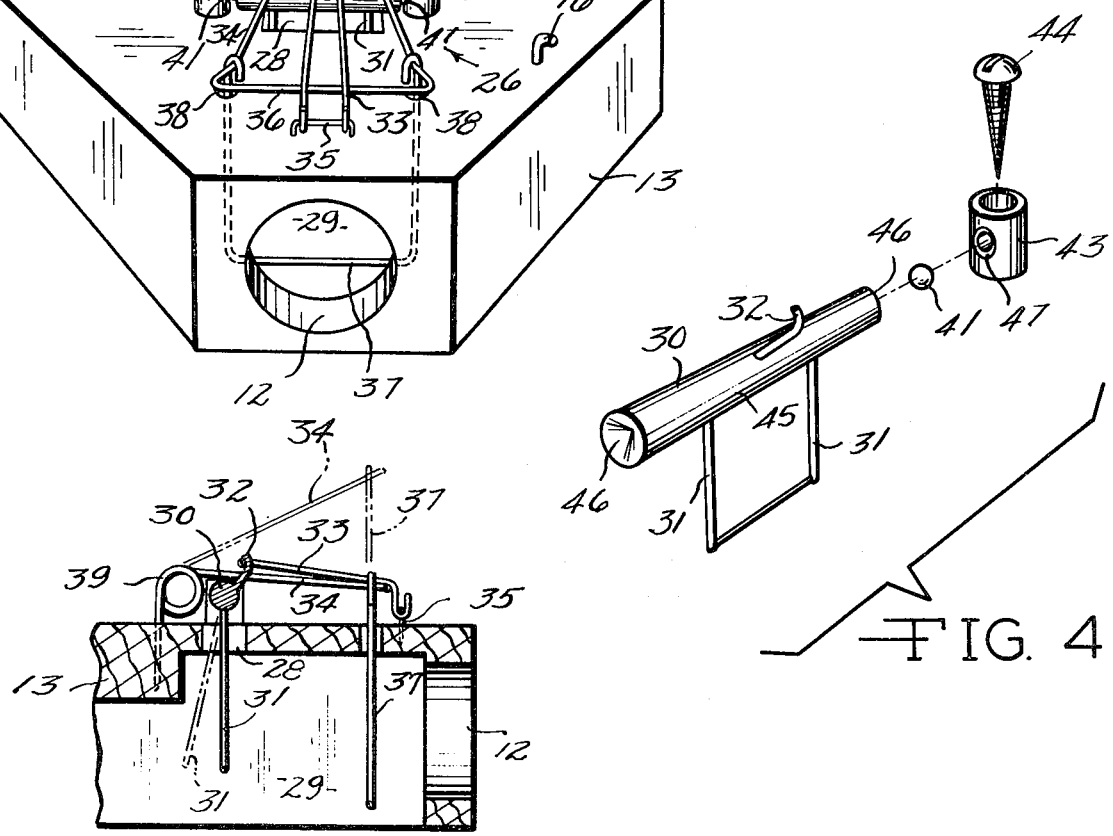
FIG. 3
FIG. 4 as mice in a manner so that the traps may be baited and set without direct contact with the animal killing means and so that the bait is not subjected to loss by consumption. Plural trap stations may be provided and the trip levers are ball bearing supported rendering the trigger-trip structures very sensitive to the stealthful intrusion of small animals who penetrate the bait access passages. The bait is provided in a perforate tube or capsule which inserted diametrically through the cover and the capsule is retained in position by the cover and inside the cover. By simply lifting the trap and pressing down on the spring loop yoke, the body of the animal is dropped free of the trap through the open bottom and the body is easily shaken free from the guillotine band or snare which crushes the animal against the upper covering of the passageway. The ball bearing supports for the trip lever structure are uniquely provided for economic construction and for in-service sensitivity. The plural cavity base includes communicating passageways so that the scent of the bait permeates the main passageways in attraction of the small animals. The bait is isolated in the dome and never reached or seen by the animals to be trapped. The base also supports the spring yoke, the cover and locks therefor, the hold-down arm for the trigger assembly and the ball bearing stanchions for the trip lever. An opening is provided so that the trigger loop of the trip lever depends into the passageway in the manner of a barrier and spaced-apart openings through the base allow the guillotine loop to depend therethrough with pivotal connection to the spring yoke. Plural of such units may be arrayed in radial orientation in respect to the base.

ANIMAL TRAP

The present invention is a new and improved animal trap especially useful for destroying small animals such Accordingly, the plural cavity trap is greatly simplified; the trigger structure is substantially improved; the bait support and cover admit of easy and clean usage; and the base is designed to be open at the bottom and amenable to mass production as by integral casting or molding in plastic. Amenability to sanitization and repeated non-offending usage characterizes the improved structure. A new and improved trip lever is provided and in use the structure of the present invention provides a level of clean performance not achieved by prior art devices. In its plural passage and station form the device is adaptable to use in commercial and food storage situations.

THE PRIOR ART

So far as is known, the general configuration of traps of the type described herein is found in earliest form in the U.S. Pat. No. 136,842 to Armstead M. Lovett. In that structure a central bait station was provided and plural radial passages were extended therefrom. However, the passages included a bottom and included side entry means for removal of impaled animals. The trigger system was much less sensitive than the ball bearing pivotal supports in the present invention. A variant of the floored trap is seen in U.S. Pat. No. 777,461 to Williamson in which the bait carrying end of the triggers depend ahead of the looped striking wires 12. Other variants following the use of a dangling bait are seen in the U.S. Pat. Nos. 882,755, 712,182, 1,807,171 and 2,286,912 of Almon A. Hamilton, John E. Cox, Guilio Pisani, and Oliver Warren Johnson, respectively. The Cox and Johnson structures show a floorless construction. In the U.S. Pat. No. 1,363,260 to F. Morrison, a floored gopher trap is disclosed in which a central bait container directly lures the gophers toward their location and to an encounter with cord-set triggers. None of these devices are regarded as anticipatory of the improved structure herein described.

GENERAL DESCRIPTION

In general, the present invention utilizes a base having one or more radially oriented compartments and the outer extremes of each compartment includes an annular entry. The base has no floor so that when the base is rested on a flat floor surface, for example, the base forms (with the floor) plural radial passages, each served by an entry opening. A guillotine or snare loop or striking wire is positioned immediately inside the entry and is transverse of the passageway. When the trap unit is cocked, the loop or striking wire depends through the base so that an animal entering the passageway locates his body over the wire loop of the guillotine. The trigger also extends across the passageway and depends through an access opening provided in the base for allowing the smells of bait to permeate the connecting passages and for locating the trigger in the position of a barrier between animal and bait smell source. The trigger is poised on ball bearings and the trap is engageable or sprung when the animal (mouse or other rodent) pursues the scent and displaceably engages the trigger barrier. Displacement of the trip by the animal releases the spring yoke and the spring snatches up the guillotine loop crushing the beast and destroying its life against the top of the passage formed by the base. The trigger-trip holding bar is pivotally secured to the base and extends over the spring loop and is secure against the resultant upward force by a trip-supported hook release. Any jiggling or displacement of the trips disturbs the hook and frees the holding bar and hence the spring loop. The spring loop connected to the guillotine or snare loop slams the animal upwardly against the ceiling of the passageway and to almost instant death. A cover is provided which is central axial dome located lockably against the upper surface of the base and extending to cover the exposed trap mechanism. A perforated bait tube is extended radially into the cover and is threadably and removably secured in place. Bait or lure or scent is placed in the perforated tube and the tube is inserted in the dome or cover. The trigger openings communicate the scent through the base upper surface and into the passageways. Each passageway beckons to animals such as mice and rodents by reason of the scent of the bait. The spring loop is secured at its ends to the base and is connected in its uncocked and cocked positions to the guillotine or snare loop. In cocking, the hold-down bar is hooked to the trigger element against the uplifting spring pressure and consequently the spring is loaded and the spring is retained in loaded condition awaiting displacement of the trip-trigger. The trip element is supported by ball bearing supported journals holding the trip element in antifriction relation and with the hook upstanding and the trip arms of the trigger depending through the base. The assembly of the anti-friction support is by means of simple tubular stanchions or collars axially held down with cap screws extending through the axes of the tubular collars and into the base in spaced-apart relation. A ball race is formed by a tapered opening through each of the collars transverse to the axis of each. This supports a ball on each side which nests in axial tapered or concical depressions in the ends of the rod forming the principal part of the trigger assembly. The hook is attached to the rod portion intermediate the ends and extends radially therefrom with a slight terminal hook bend. Depending from the rod is the trip comprising arms and transverse barrier. Encounter of the trip against an animal entering the structure release the spring and achieves the kill or strike by the guillotine. No animal is visible and access to the release of the animal carcasses is by removal of the cover and simple depression of the spring loops. The animal falls free from the bottom of the base and out of the passage. If blood is left, then the structure is easily washed and sanitized, as desired, for reuse. In most instances the animals are cleanly killed and the guillotine or snare operation prevents threshing about and mess beyond the point of kill. Baiting is simple for the housewife and stale bait is easily discarded and the bait tube recharged. The invention possesses improved sensitivity, amenability to mass production, and possesses repetitive usage capability while assuring cleanliness of operation.

IN THE DRAWING

FIG. 1 is a partially exploded perspective of the animal trap of the present invention with the cover in place locked onto the base and with the perforated bait tube and threaded cap shown in assembly and disassembly relationship.

FIG. 2 is a perspective view of the base element of the animal trap shown in FIG. 1 and with the cover or dome removed therefrom to indicate one of plural trap mechanisms shown poised and cocked ready for capturing and killing animals who enter the plural radial passageways in the trap. The phantom lines show the other position of the trap units.

FIG. 3 is a fragmental cross section elevational view taken on a plane passing transversely through the base shown in FIG. 2 and through the trap mechanism revealing its construction in cocked position (full line) and spring position (phantom line).

FIG. 4 is an exploded perspective view of the ball bearing support construction for the trigger and trip pivotal element as located at one end of the rod with the conical end depressions and the tubular stanchions.

SPECIFIC DESCRIPTION

Referring to the drawing and with first particularity to the FIG. 1 thereof, the present invention is seen as an animal trap 11 having one or more passages therethrough and the annular entries 12 thereto are visible around the perimeter of the base 13. As will be seen, the base 13 is open at the bottom so that as the trap 11 is placed on a plane surface, the passageways are defined along which an animal passes seeking the bait suggested by the scent which permeates the passageways.

The cover or dome 14 is positioned on the top platform 15 of the base 13 as by the lock pins 16 which lockably engage the lock slots 17 provided in the lower perimeter edge of the dome or cover 14. Simple turning of the dome 14 unlocks and frees the dome 14 from the base 13 and opposite turning closes the perimeter edge 18 of the dome 14 against the upper surface 15 of the base 13. An access 19 is provided diametrically into the dome 14. The access opening 19 axially receives a perforate tubular bait capsule or bait sleeve 20 into which bait 21, as grain, cheese particles, fish, or meat scraps, can be placed. A cap 22 covers the bait capsule 20 and holds it suspended across the interior of the dome 14. The cap 22 includes a cylindrical plug 23 which axially enters the end of the capsule 20 for easy insertion and withdrawal from the threaded nipple 24 defining the access opening 19 in the dome 14. Mating threads 25 in the cap 22 allow the cap 22 to securely close the opening 19. The perforations 20a in the capsule 20 assures retention of the bait particles 12 and allows the smell or scent to freely enter the dome 14 and, as will be seen, the passageways.

While other bait holders may be used, the intent of the bait usage is to isolate the bait fragments 21 from the animal but to entice the movement of the animal toward the bait along the passages in the base 13. In the eagerness of the animal to gain access to the bait 21, as will be seen, the animal hastens its demise.

In FIG. 2 the cover 14 has been removed from the base 13 revealing that the base 13 supports trap mechanism 26 which, in plural units, occupy also the positions indicated by the phantom lines of the stations 27. The lock pins 16 protrude upwardly from the upper surface 15 of the base 13 and each station includes a slot-like opening 28 which opens into the passageway 29 below the surface 15. The opening 28 allows movement of the bait scent (supported in the internal space of the dome 14) to concentration in the passages 29 and accessible to the animal at the entry opening 12. The trap mechanism 26 is shown in its cocked position in the FIG. 2. The mechanism 26 includes an anti-friction supported trip 30 which is positioned over the opening 28 so that a trigger portion 31 of the trip element 30 depends into the passage 29 to form a transverse barrier across the passage 29. On the upper side of the trip element 30 and opposite the depending trigger portion is a hook portion 32 projecting upward so as to provide an easily displaceably latch, as will be seen. The hook portion 32 is positioned so that (on latching) the trigger portion 31 of the trip element 30 projects vertically through the opening or slot 28. The latching occurs upon cocking of each unit of the trap 11 when the hold-down element 33 is positioned above the spring loop 34 when the spring loop 34 is loaded and cocked as shown in FIG. 2. The hold-down element 33 is pivotally supported at the base 13 on upper surface 15 by the support bar 35 attached to the base 13. This positioning assures that the bail or yoke portion 36 of the spring loop 34 impinges against the hold-down element 33 in prevention of release. The spring 34 holds the guillotine-snare wire loop 37 in a pivoting and lifting relationship as shown and through the spaced-apart openings 38 which extend through the surface 15 of the base 13. Since the spring loop 34 must be strong, the energy storing coiled portions 39 of the spring loop 34 are back of the trip element 30 and their ends 40 (FIG. 3) are secured to the base 13.

The anti-friction support for the trip element is achieved by ball bearings and the balls 41 thereof are supported on a race 42 provided in the stanchions 43 on each end of the trip element 30 and the stanchions 43 are secured to the base 13 as by fasteners 44. The races on the trip element 30 are tapered conical recesses extending on the shaft axis of the trip element 30. The ball 41 to taper race contact is a line annulus at stanchions 43 and trip element 30.

By reference to FIG. 3, the described trigger construction can be better appreciated and the trap unit mechanism 26 is functionally expressed. The spring loop 34 is anchored at its ends 40 adjacent the coils 39. The structure is cocked (as shown in full line) in FIG. 3.

Then, an animal picks up the scent adjacent to entry 12 and follows the delights over and through the entry 12, over the guillotine-snare loop 37, and in the groping of the animal toward the food in the confined passage, the trigger barrier 31 is moved. Such displacement rotates the trip bar 30 and also rotates the hook element 32 and freeing it from the hold-down 33. The trap mechanism 26 is then sprung (phantom line) and as the spring loop 34 is raised by the bail portion 36 of the spring loop 34, it lifts the guillotine-snare 37 and lifts and smashes the animal a fatal blow against the upper wall or ceiling of the passage 29 comprising the surface 15 of the base 13. The phantom lines show the pivoting of the trigger 31 and the release position of the spring loop or yoke 34. The sensitivity of the trigger 31 is achieved by reason of the balls 41 providing anti-friction journalling so that as the trigger 31 is slightly displaced, the hook 32 is releasing the hold-down 33 and spring loop or yoke 34. In FIG. 3 it is clear that after the threshold of entry 12 there is no floor in the passageways 29.

In FIG. 4 the simplicity of the ball bearing anti-friction support for the trip-trigger 30, 31, 32 is better appreciated. The depending trigger elements 31 are connected to the elongate cylindrical main body 45 of the trip-trigger 30. The body 45 is provided on its ends with tapered or conical depressions 46 coaxial with the axis of the trip-trigger 30. These tapered depressions 46 support the balls 41 in a line contact. (Only one ball 41 is shown.) The balls 41 are very easily supported on the base 13 by the races 42 provided in the tubular stanchions 43. The races 42 are very simply formed by inserting a drill through the wall of the tubular element 43 and into the axial cavity of the elongate tubular body. Then a fastener 44 such as a screw, as shown, runs through the axis of the stanchions 43 holding it to the base 13 and securing the stanchions 43 in place aligning them to receiving and compression contact against the balls 41.

The base 13 may be made of wood or plastic and where made from plastic the base may be repetitively and accurately prepared at minimal cost in high volume as by injecting molding. The trigger-trip element 30 may also be prepared from suitable plastic material, as is also true of the cover 14 and the bait capsules 20. Since the stanchions 43 do not receive severe stressing, they may also be made in plastic. The balls 41, the hold-down element 33, spring loop 34 and fasteners 44 are best fabricated from metal wire.

The sensitivity of guillotine-snare units has been vastly improved. The ease of baiting has been materially simplified and cocking the trap does not require manipulation of the killing surfaces. A housewife need never see the animal, rodent or mouse as killed by the trap. In removal of the animal, the animal falls free of the open bottomed passage and the unit construction allows for preparation of plural unit traps useful in cellars, homes, and granaries where bulk food is stored. Finally, the structure is easily cleaned and sanitized for storage and reuse many times.

Having thus described my invention and the preferred embodiment with substantial detail, those skilled in the art will discern improvements, modifications and changes falling within the skill of the art and such improvements, changes and modifications are intended to be included in the spirit of the present invention, limited only by the scope of my hereinafter appended claims.

I claim:

1. An animal trap having plural stations, each station comprising:
    a base having a passageway with an open bottom and an outer annular opening to said passageway;
    an anti-friction pivotally supported trip connected to said base having an upstanding hook element and having a depending trigger portion extending into said passageway ;
    a spring loop operably supported by said base at one end and extending generally over and above said passageway;
    a guillotine-snare loop in said passageway through said base and pivotally and operably connected to said spring loop and extending across said passageway;
    a hold-down element pivotally connected to said base above said passageway adjacent said outer annular openings and releasably connected to said hook portion of said trip over said depressed spring loop and displaceable upon movement of said trigger portions of said trip thereby freeing said spring loop; and
    a cover over said plural stations, said cover having a threaded nipple thereinto and having a perforated tubular removable bait container therein supported in said nipple and a cap matingly engageable over the threaded portion of said nipple.

2. In the combination of claim 1 wherein said anti-friction pivotally supported trip is journalled on ball bearings in which one race is in a tapered conical depression at the ends thereof and the other race is in a tapered or conical slot in stanchions in spaced-apart coaxial relation with said trip for pivotal connection to said base.

* * * * *

UNITED STATES PATENT AND TRADEMARK OFFICE
CERTIFICATE OF CORRECTION

PATENT NO.   :   4,462,182
DATED        :   July 31, 1984
INVENTOR(S)  :   Roy E. French It is certified that error appears in the above-identified patent and that said Letters Patent is hereby corrected as shown below:

Column 3, line 8, change "release" to read
--- releases ---

Column 4, line 8, change "12" to read --- 21 ---

Column 4, line 48, insert "loop" after "spring"

Column 5, line 42, change "injecting" to read
--- injection ---

Signed and Sealed this

Twenty-seventh Day of November 1984

[SEAL]

Attest:

Attesting Officer

GERALD J. MOSSINGHOFF

Commissioner of Patents and Trademarks